United States Patent [19]
Hashimura

[11] Patent Number: 5,696,793
[45] Date of Patent: Dec. 9, 1997

[54] PHASE DIFFERENCE DETECTION CIRCUIT FOR EXTENDED PARTIAL-RESPONSE CLASS-4 SIGNALING SYSTEM

[75] Inventor: Yoshihiro Hashimura, Kawasaki, Japan

[73] Assignee: Fujitsu Limited, Kawasaki, Japan

[21] Appl. No.: 530,863

[22] Filed: Sep. 19, 1995

[30] Foreign Application Priority Data

Nov. 11, 1994 [JP] Japan .................................. 6-277313

[51] Int. Cl.⁶ .................................................. H04L 25/49
[52] U.S. Cl. .......................... 375/294; 375/290; 375/375; 360/51
[58] Field of Search ........................... 375/290, 293–294, 375/355, 375, 376; 370/517, 519; 360/51; 327/158, 163, 236

[56] References Cited

U.S. PATENT DOCUMENTS

| | | | |
|---|---|---|---|
| 4,339,823 | 7/1982 | Predina et al. | 375/294 |
| 4,651,026 | 3/1987 | Serfaty et al. | 375/294 X |
| 4,890,299 | 12/1989 | Dolivo et al. | 375/290 |
| 5,216,554 | 6/1993 | Schneider | 360/51 |
| 5,265,125 | 11/1993 | Ohta | 375/290 X |
| 5,267,267 | 11/1993 | Kazawa et al. | 375/294 |

FOREIGN PATENT DOCUMENTS

| | | |
|---|---|---|
| 58-95452 | 6/1983 | Japan . |
| 1-102777 | 4/1989 | Japan . |
| 1-292610 | 11/1989 | Japan . |
| 1-296466 | 11/1989 | Japan . |
| 4-177603 | 6/1992 | Japan . |
| 5-6619 | 1/1993 | Japan . |
| 5-62104 | 3/1993 | Japan . |
| 6-36208 | 2/1994 | Japan . |

*Primary Examiner*—Young T. Tse
*Attorney, Agent, or Firm*—Greer, Burns & Crain, Ltd.

[57] ABSTRACT

Disclosed is a phase difference detection circuit for detecting a phase difference between an equalized signal obtained by equalizing an extended partial-response class-4 signal and a sampling clock. This phase difference detection circuit has a sample hold circuit for sampling and holding the equalized signal at the sampling clock, a comparator circuit for comparing the sampled and held signals with at least four slice levels and converting them into determination level signals having at least quinary values and a phase difference generation circuit for generating a phase difference on the basis of at least the quinary determination level signals from the comparator circuit and outputs of the sample hold circuit. The EPR-4 signals are quinary-determined, and it is therefore possible to measure the phase difference by accurately detecting a peak position or a zero cross position of the signal.

10 Claims, 13 Drawing Sheets

FIG. 4A
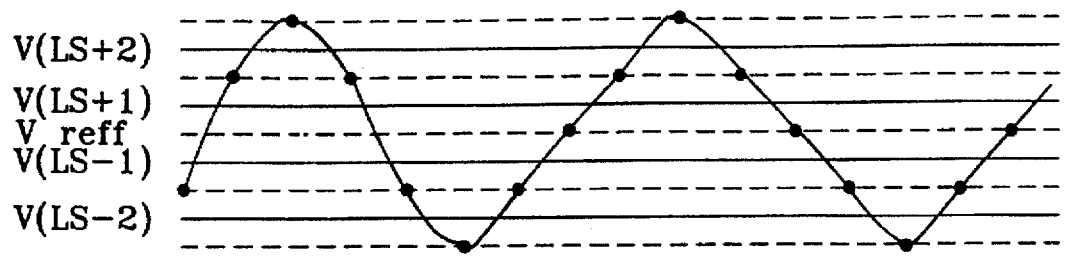
FIG. 4B
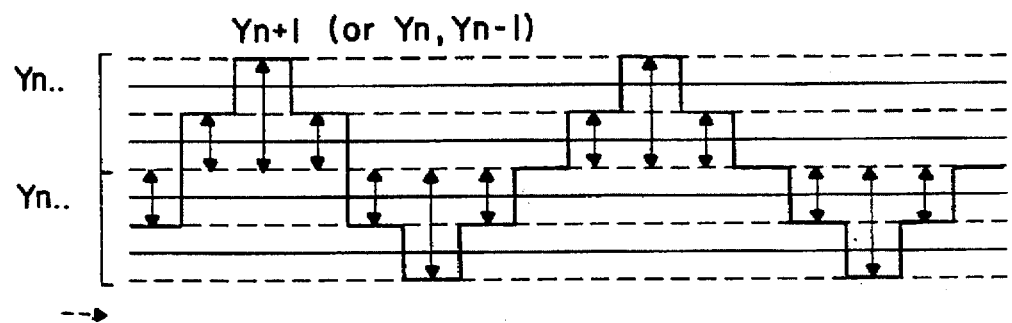
FIG. 4C
|  | ↑ | ↑ | ↑ | ↑ | ↑ | ↑ | ↑ | ↑ | ↑ | ↑ | ↑ | ↑ | ↑ | ↑ |
|---|---|---|---|---|---|---|---|---|---|---|---|---|---|---|
| X(+2)n+1,0 | 0 | 1 | 0 | 0 | 0 | 0 | 0 | 1 | 0 | 0 | 0 | 0 | 0 | 0 |
| X(+1)n+1,0 | 1 | 0 | 1 | 0 | 0 | 0 | 1 | 0 | 1 | 0 | 0 | 0 | 0 | 0 |
| X(+0)n+1,0 | 0 | 0 | 0 | 0 | 0 | 1 | 0 | 0 | 0 | 1 | 0 | 0 | 0 | 1 |
| X(−1)n+1,1 | 0 | 0 | 0 | 1 | 0 | 1 | 0 | 0 | 0 | 0 | 1 | 0 | 1 | 0 |
| X(−2)n+1,0 | 0 | 0 | 0 | 0 | 1 | 0 | 0 | 0 | 0 | 0 | 0 | 1 | 0 | 0 |
--→

PHASE DIFFERENCE DETECTION CIRCUIT FOR EXTENDED PARTIAL-RESPONSE CLASS-4 SIGNALING SYSTEM

BACKGROUND OF THE INVENTION

1. Field of the Invention

The present invention relates to a phase difference detection circuit for detecting a phase difference between a sampling clock and an extended partial-response class-4 signal in an extended partial-response class-4 signaling system.

2. Description of the Related Art

Partial-response signaling has been utilized for improving a recording density of a magnetic disk and a magneto-optic disk device, etc. in recent years. The partial-response signaling is defined as a method of performing a bandwidth compression of digital data by making use of a code-to-code interference (waveform interference) of signals.

Extended partial-response class-4 signaling (hereinafter abbreviated to EPR-4 signaling) is known among such partial-response signaling methods. A method capable of detecting a phase difference is also required in this EPR-4 signaling.

The EPR-4 signaling is known from the specification of U.S. Pat. No. 4,890,299. This EPR-4 signaling has a signaling characteristic of $(1+D-D^2-D^3)$.

Generally, in a partial-response regeneration, after detecting a phase difference between a signal after equalizing the partial-response signal and a sampling clock, a generation timing of the sampling clock is controlled based on this phase difference. This is termed a PLL (Phase Locked Loop). This entails a phase difference detection circuit for detecting the phase difference between the signal after equalizing the partial-response signal and the sampling clock.

In the partial-response regeneration, the method of detecting the above phase difference is disclosed in U.S. Pat. No. 4,890,299 given above and a treatise titled [FAST TIMING RECOVERY FOR PARTIAL-RESPONSE SIGNALING SYSTEMS] (1986 IEEE CH2655-9/89/0000-0573) written by F. Dolivo, W. Scott and G. Ungerbock.

That is, a phase difference $\Delta\tau(n)$ is expressed by the following formula:

$$\Delta\tau(n) = Y(n-1) \cdot X(n) - Y(n) \cdot X(n-1)$$

where Y(n) is the sampling voltage of a read signal after being partial-response-equalized at an (n) sampling time, and X(n) is the ternary determination result given by a ternary determination unit.

Such a conventional phase difference detection circuit attained sufficient achievements in terms of both a PLL drawing performance and a PLL follow-up performance with respect to especially PR-4 (partial-response class-IV) signaling. If this conventional phase difference detection circuit is applied to EPR-4 signaling, however, there arises a problem in which the phase difference is hard to detect in such signals that a signal system is the one exclusive of a specified pattern.

SUMMARY OF THE INVENTION

It is a primary object of the present invention to provide a phase difference detection circuit for accurately detecting a phase difference between an EPR-4 signal and a sampling clock.

It is another object of the present invention to provide an EPR-4 signal phase difference detection circuit for detecting a phase difference between the EPR-4 signal and the sampling clock with a simple construction.

To accomplish the above objects, according to the present invention, there is provided a phase difference detection circuit for detecting a phase difference between an equalized signal obtained by equalizing an extended partial-response class-4 signal and a sampling clock. This phase difference detection circuit has a sample hold circuit for sampling and holding the equalized signal at the sampling clock, a comparator circuit for comparing the sampled and held signals with at least four slice levels and converting them into determination level signals having at least quinary values and a phase difference generation circuit for generating a phase difference on the basis of at least the quinary determination level signals from the comparator circuit and outputs of the sample and hold circuit.

According to the present invention, the sample and hold output is converted into at least quinary values. The conversion into the quinary or larger values makes it possible to detect an easy-to-detect waveform portion (peak position, zero cross position) of the phase difference of the EPR-4 signal from the quinary outputs. The phase difference of the EPR-4 signal is detected by detecting this easy-to-detect waveform portion, whereby the phase difference of the EPR signal can be detected.

Other features and advantages of the present invention will become readily apparent from the following description taken in conjunction with the accompanying drawings.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principle of the invention, in which:

FIGS. 4A, 4B and 4C are diagrams of assistance in explaining the operation of the quinary determination circuit of FIG. 3;

DETAILED DESCRIPTION OF THE PREFERRED EMBODIMENTS

Figure 1:
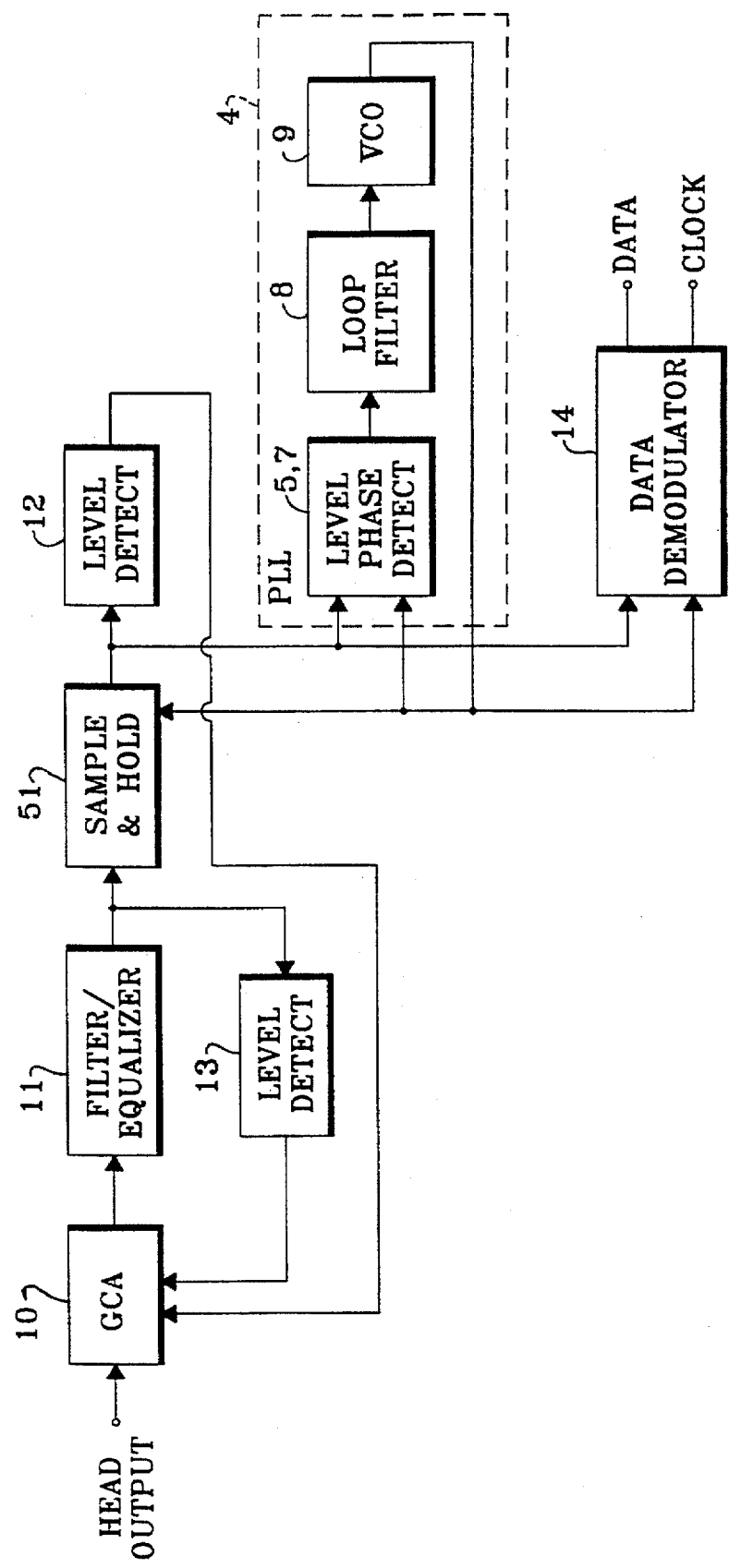
FIG. 1 is a diagram illustrating a configuration of a magnetic record demodulator circuit in one embodiment of the present invention.

FIG. 1 is a block diagrams illustrating a demodulator circuit of a magnetic disk in one embodiment of the present invention. As illustrated in FIG. 1, a read output of an unillustrated magnetic head is inputted to a gain control amplifier 10. The gain control amplifier 10 amplifies the output of the magnetic head with a predetermined gain and outputs it. A gain thereof is controlled by output of level detection circuits 12, 13 that will be described later.

An output of the gain control amplifier 10 is inputted to a filter/equalizer 11. The filter/equalizer 11 equalizes an EPR-4 signal. An output (referred to as an EPR equalized signal) of this filter/equalizer 11 is inputted to a sample-and-hold circuit 51. The sample-and-hold circuit 51 effects sampling of the EPR equalized signal at a clock timing and then hold it.

The first level detection circuit 12 detects an output level of the sample-and-hold circuit 51. Then, the gain of the gain control amplifier 10 is controlled by the thus detected level. The second level detection circuit 13 detects an output level of the filter/equalizer 11. Then, the gain of the gain control amplifier 10 is controlled by the thus detected level.

A PLL circuit 4 generates a clock (PLL clock) modified corresponding to a phase difference between a clock and an output of the sample-and-hold circuit 51.

The PLL circuit 4 is, as will be explained in FIG. 2, constructed of a level phase detection circuit including a quinary determination circuit 5 and a phase difference generation circuit 7, a loop filter 8 and a voltage controlled oscillator (VCO) 9.

A data demodulator circuit 14 is constructed of a Viterbi demodulator. Then, this data demodulator circuit 14 generates data DATA and a clock CLOCK on the basis of a PLL clock and an output of the sample-and-hold circuit 51.

Figure 2:
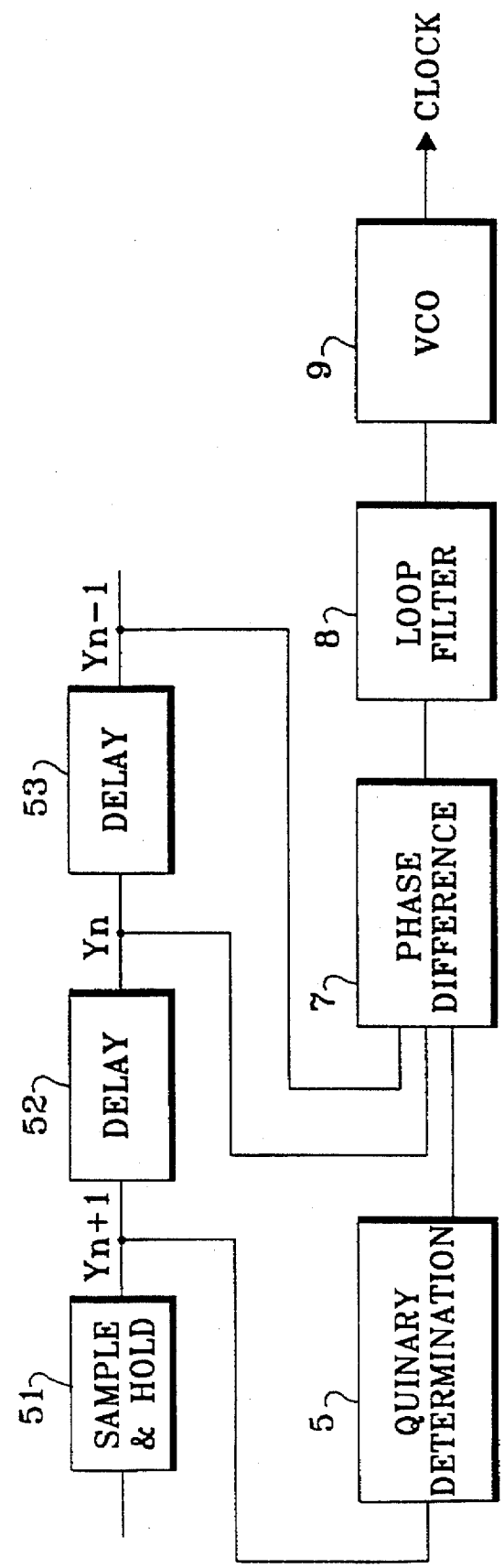
FIG. 2 is a diagram illustrating a configuration of a PLL circuit of FIG. 1.

FIG. 2 is a block diagram illustrating the PLL circuit in one embodiment of the present invention. FIG. 2 fully illustrates the PLL circuit shown in FIG. 1.

As shown in FIG. 2, the above sample-and-hold circuit (hereinafter abbreviated to sample/hold circuit) 51 samples the EPR equalized signal at the clock timing and hold the sampled signal. Then, the sample/hold circuit 51 outputs a sample hold output $Y_{n+1}$ at an (n+1) sampling time. A first analog delay circuit 52 delays the sample hold output $Y_{n+1}$ of the sample/hold circuit 51 by one clock and outputs a first delay output $Y_n$ (a sample hold output at the (n) sampling time).

A second delay circuit 53 delays the delay output $Y_n$ of the first analog delay circuit 52 by one clock and outputs a second delay output $Y_{n-1}$ (a sample and hold output at (n−1) sampling time). The first and second analog delay circuits 52, 53 are constructed of circuits each incorporating a sample/hold function.

A quinary determination circuit 5, as will be mentioned later in FIG. 3, determines the sample and hold output of the sample/hold circuit 51 in quinary values. The quinary values are five kinds of values such as [+2], [+1], [0], [−1], [−2]. An output of the quinary determination circuit 5 is represented by $X(S)_{n+1}$, and a determination value is put into [S]. For example, a quinary determination output with the quinary determination value being [+2] is expressed by $X(+2)_{n+1}$.

The phase difference generation circuit 7 detects, as will be explained in the drawings inclusive of FIG. 5, a signal assuming a level corresponding to a phase difference from the quinary determination output, the first delay output $Y_n$ and the second delay output $Y_{n-1}$. The loop filter circuit 8 performs filtering of the level signal corresponding to the phase difference. The voltage controlled oscillator 9 generates the clock CLOCK assuming a phase corresponding to a voltage of the loop filter 8.

Figure 3:
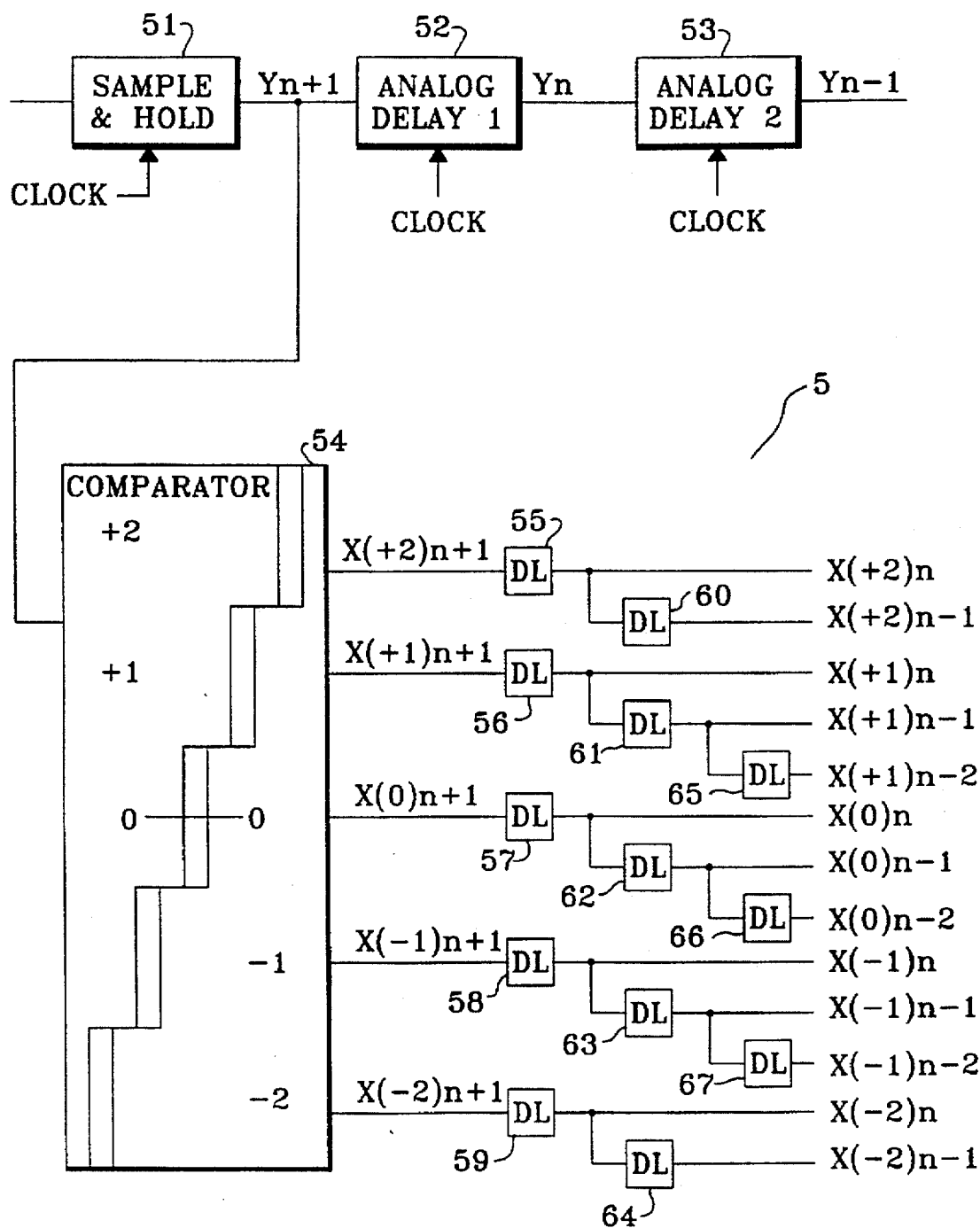
FIG. 3 is a block diagram showing a quinary determination circuit of FIG. 2.

FIG. 3 is a block diagram illustrating the quinary determination circuit of FIG. 2. FIGS. 4A, 4B and 4C are diagrams of assistance in explaining an operation of the quinary determination circuit of FIG. 3.

The quinary determination circuit 5 includes a quinary comparator circuit 54. The quinary comparator circuit 54 compares the inputted sample hold output $Y_{n+1}$ with four determination levels V(LS+2), V(LS+1), V(LS−1), V(LS−2) and converts them into quinary (5-bit) logic signals $X(+2)_{n+1}$, $X(+1)_{n+1}$, $X(0)_{n+1}$, $X(-1)_{n+1}$, $X(-2)_{n+1}$.

FIG. 4A is a diagram showing a relationship between the sample and hold input signal and the determination levels. As shown in FIG. 4A, the four determination levels V(LS+2)–V(LS−2) of the quinary comparator circuit 54 are set at equal intervals with a reference voltage Vref of the circuit being centered.

FIG. 4B is a diagram showing a relationship between the sample and hold output signal and the determination levels. Then, as shown in FIG. 4B, the sample and hold signal and the delay signal thereof turn out as illustrated in the Figure. This sample and hold signal is compared with the four levels V(LS+2)–V(LS−2). As a result, the quinary comparator circuit 54 generates, as shown in FIG. 4C, the 5-bit (quinary) logic signals (determination level signals) $X(+2)_{n+1}$–$X(-2)_{n+1}$.

The above-described quinary comparator circuit is, as known well, constructed of four signal comparing amplifiers and a group of gates.

Five sets of first digital delay circuits 55–59 delay logic outputs $X(+2)_{n+1}$–$X(-2)_{n+1}$ of the respective quinary comparator circuits 54 by a one-sample time and generate logic signals $X(+2)_n$–$X(-2)_n$. Five sets of second digital delay circuits 60–64 delay respectively logic outputs $X(+2)_n$–$X(-2)_n$ of the first digital delay circuits 55–59 by the one-sample time and generate logic signals $X(+2)_{n-1}$–$X(-2)_{n-1}$. Three sets of third digital delay circuits 65–67 delay respectively logic outputs $X(+1)_{n-1}$–$X(-1)_{n-1}$ of the second digital delay circuit 61–63 by the one-sample time and generate logic signals $X(+1)_{n-2}$–$X(-1)_{n-2}$.

Accordingly, the quinary determination circuit 5 is constructed of the quinary comparator circuit 54 for quinary-determining the sample and hold output and the digital delay circuit 55–67 for generating respective delayed signals of outputs thereof. These digital delay circuits 55–67 are composed of flip-flops. Outputs of the quinary determination circuit 5 thereby turn out to be $X(+2)_{n+1}$–$X(-2)_{n+1}$ at the (n+1) sampling time, $X(+2)_n$–$X(-2)_n$ at the (n) sampling time, $X(+2)_{n-1}$–$X(-2)_{n+1}$ at the (n−1) sampling time and $X(+1)_{n-2}$–$X(-1)_{n-2}$ at the (n−2) sampling time.

Next, one embodiment of the phase difference generation circuit will be explained with reference to FIGS. 5 and 6. FIG. 5 is a block diagram illustrating one embodiment of the phase difference generation circuit of FIG. 3. FIG. 6 is a diagram of assistance in explaining a phase difference generating operation in the embodiment of FIG. 5.

Figure 5:
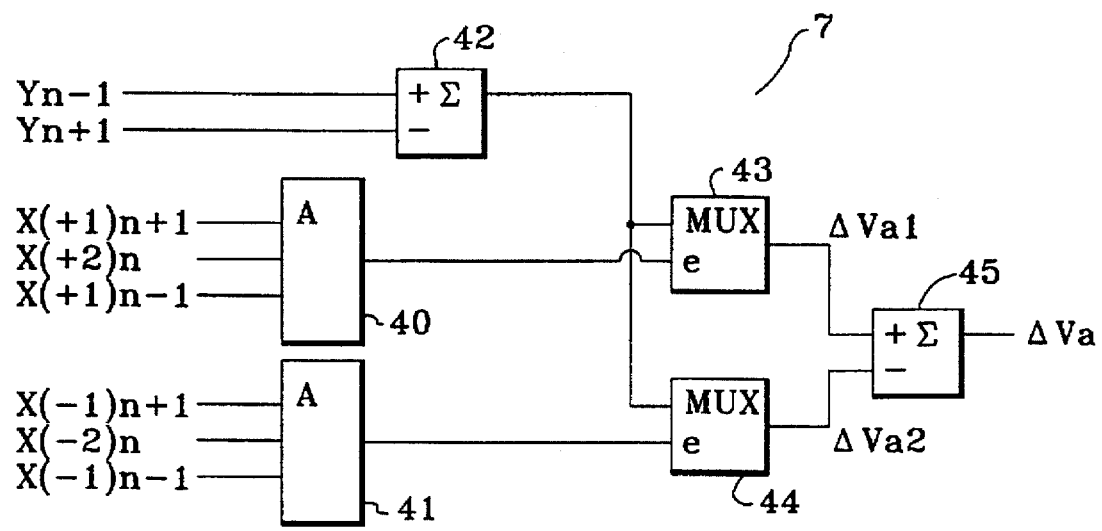
FIG. 5 is a block diagram illustrating one embodiment of a phase difference generation circuit of FIG. 2.
Figure 6:
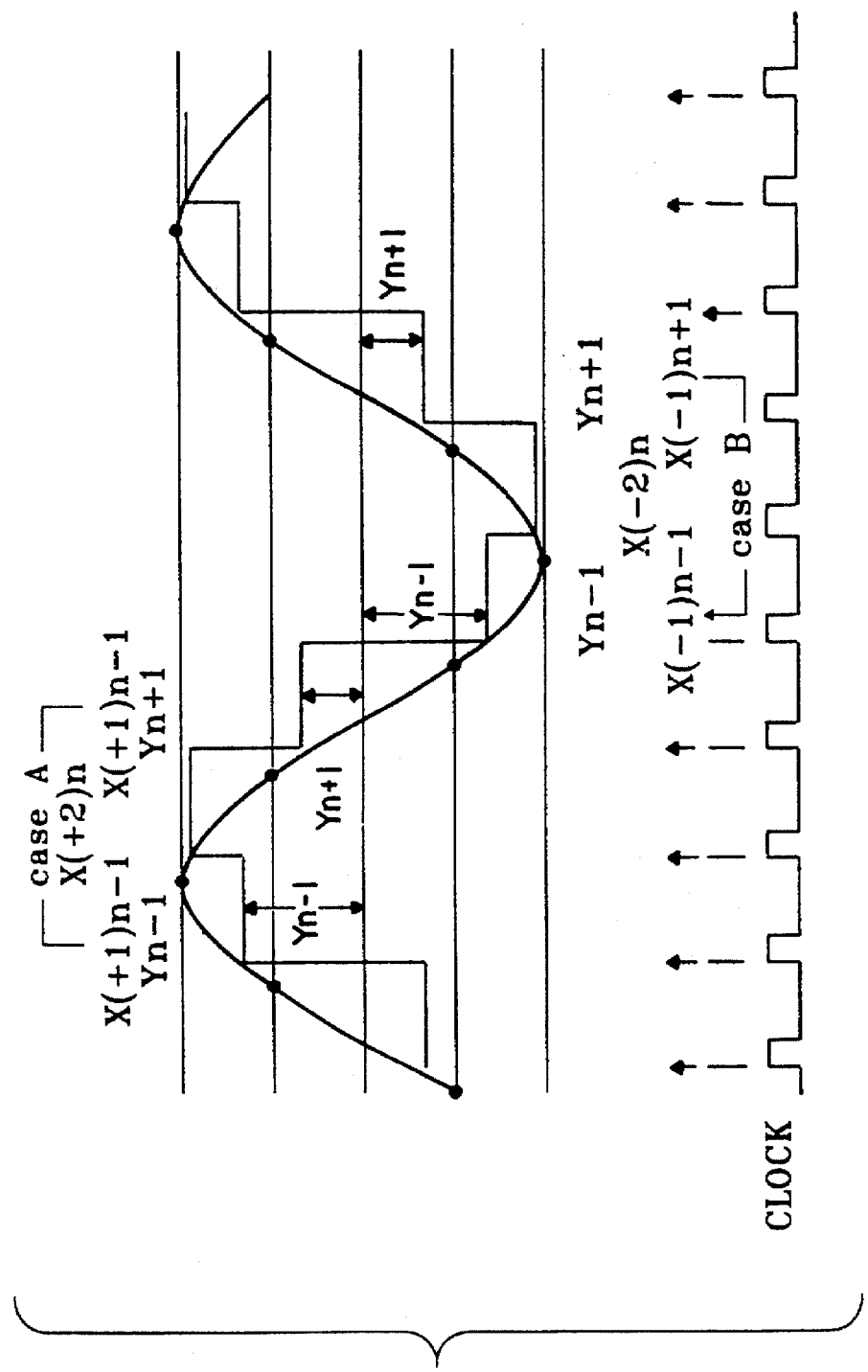
FIG. 6 is a diagram of assistance in explaining a phase difference generating operation in one embodiment of FIG. 5.

As illustrated in FIG. 5, a first AND gate 40 takes the AND of the three logic signals $X(+1)_{n+1}$, $X(+2)_n$, $X(+1)_{n-1}$. That is, the first AND gate 40 generates an enable output when the signal level is [+1] at the (n+1) sampling time, when the signal level is [+2] at the (n) sampling time, and when the signal level is [+1] at the (n−1) sampling time.

The second AND gate 41 takes the AND of the three logic signals $X(-1)_{n+1}$, $X(-2)_n$, $X(-1)_{n-1}$. That is, the second AND gate 41 generates the enable output when the signal level is [−1] at the (n+1) sampling time, when the signal level is [−2] at the (n) sampling time, and when the signal level is [−1] at the (n−1) sampling time.

An adder 42 subtracts a sample and hold output $Y_{n+1}$ at the (n+1) sampling time from a second delay signal $Y_{n-1}$ at the (n−1) sampling time. A first selection circuit 43, when the enable signal is generated from the first AND gate 40, selectively gives forth outputs of the adder 42. A second selection circuit 44, when the enable signal is generated from the second AND gate 41, selectively gives forth the outputs of the adder 42.

An adder 45 subtracts an output ΔVa2 of the second selection circuit 44 from an output ΔVa1 of the first selection circuit 43 and outputs a control voltage ΔVa to the loop filter 8.

The operation thereof will be explained with reference to FIG. 6. This operation is all exemplified by showing that PLL CLOCK is delayed with respect to the input signal (EPR equalized signal). Then, it is considered that a positive voltage is outputted at that time, and PLL is controlled.

As illustrated in FIG. 6, in a case A where a phase is detected at a positive peak of the EPR equalized signal, signals to be compared are signals $Y_{n-1}$ and $Y_{n+1}$ before and after the peak. Then, a difference $(Y_{n-1}-Y_{n+1})$ therebetween is positive, and, besides, it is determined that as the difference increases, the clock phase is delayed.

In this embodiment, the signal peak is detected, and the phase difference is generated from sample values before and after the peak. Accordingly, as a first condition, $(Y_{n-1}-Y_{n+1})$ is obtained when $X(+1)_{n-1}$, $X(+2)_n$, $X(+1)_{n+1}$ are [1].

Namely, $(Y_{n-1}-Y_{n+1})$ is obtained from the first selection circuit 43 by generating the enable signal from the first AND gate 40 when detecting such a positive peak that the signal level is [+1] at the (n+1) sampling time, the signal level is [+2] at the (n) sampling time, and the signal level is [+1] at the (n−1) sampling time.

The control signal ΔVa1 at this time is expressed by the following formula:

$$\Delta Va1=\{X(+1)_{n-1}*X(+2)_n*X(+1)_{n+1}\}\times(Y_{n-1}-Y_{n+1}) \quad (1)$$

Next, in a case B of detecting the peak at a negative peak of the signal, the signals to be compared are also the signals $Y_{n-1}$ and $Y_{n+1}$ before and after the peak. Then, a difference $(Y_{n-1}-Y_{n+1})$ therebetween is negative, and, besides, it is determined that as the difference therebetween increases, the clock phase is delayed.

In this embodiment also, the signal peak is detected, and the phase difference is generated from the sample values before and after the peak. Accordingly, as a second condition, $(Y_{n-1}-Y_{n+1})$ is obtained when $X(-1)_{n-1}$, $X(-2)_n$, $X(-1)_{n+1}$ are [1].

Namely, $(Y_{n-1}-Y_{n+1})$ is obtained from the second selection circuit 44 by generating the enable signal from the second AND gate 41 when detecting such a negative peak that the signal level is [−1] at the (n+1) sampling time, the signal level is [−2] at the (n) sampling time, and the signal level is [−1] at the (n−1) sampling time.

The control signal ΔVa2 at this time is expressed by the following formula:

$$\Delta Va2=\{X(-1)_{n-1}*X(-2)_n*X(-1)_{n+1}\}\times(Y_{n-1}-Y_{n+1}) \quad (2)$$

Hence, the control voltage ΔVa outputted from the adder 45 at this time is expressed by the following formula (3):

$$\Delta Va=\Delta Va1-\Delta Va2 \quad (3)$$

Thus, the positive and negative peaks of the signal are detected, and the control voltage is obtained from the signal values on both sides thereof. Therefore, the phase difference can be exactly detected also in the EPR-4 signal.

Figure 7:
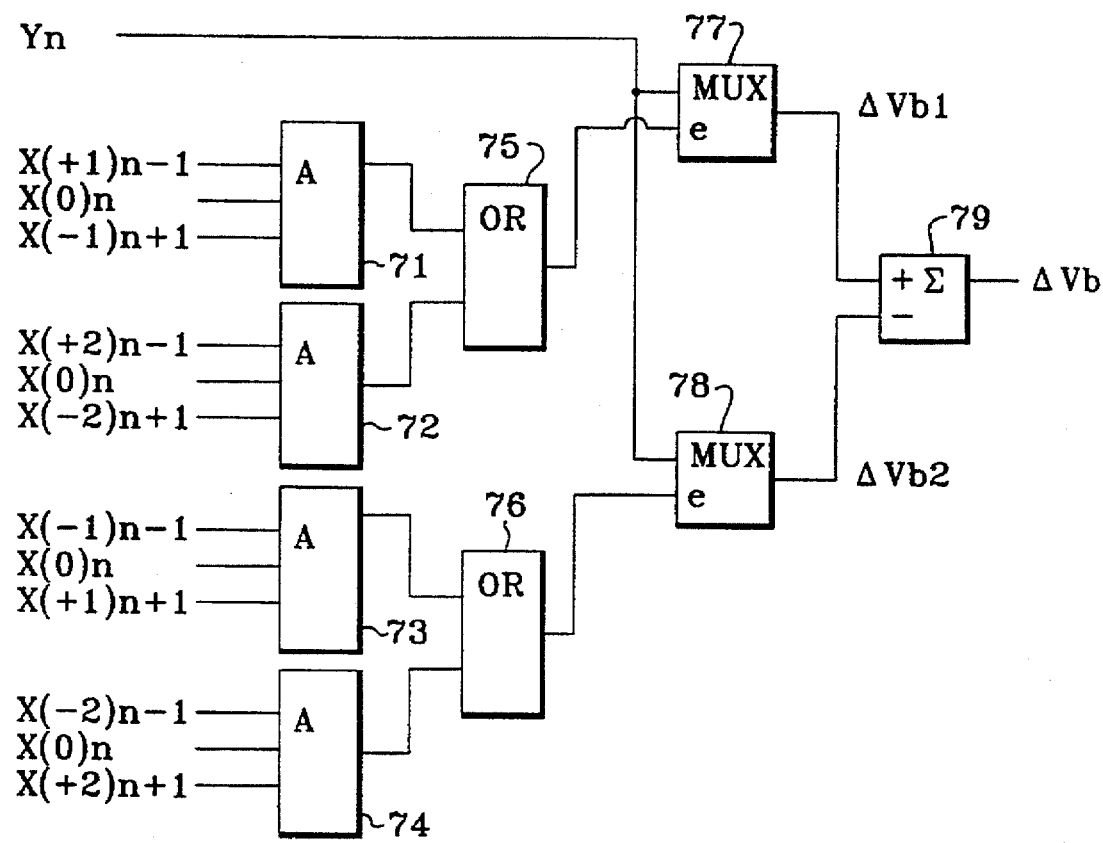
FIG. 7 is a block diagram showing a first modified embodiment of the phase difference generation circuit of FIG. 2.
Figure 8:
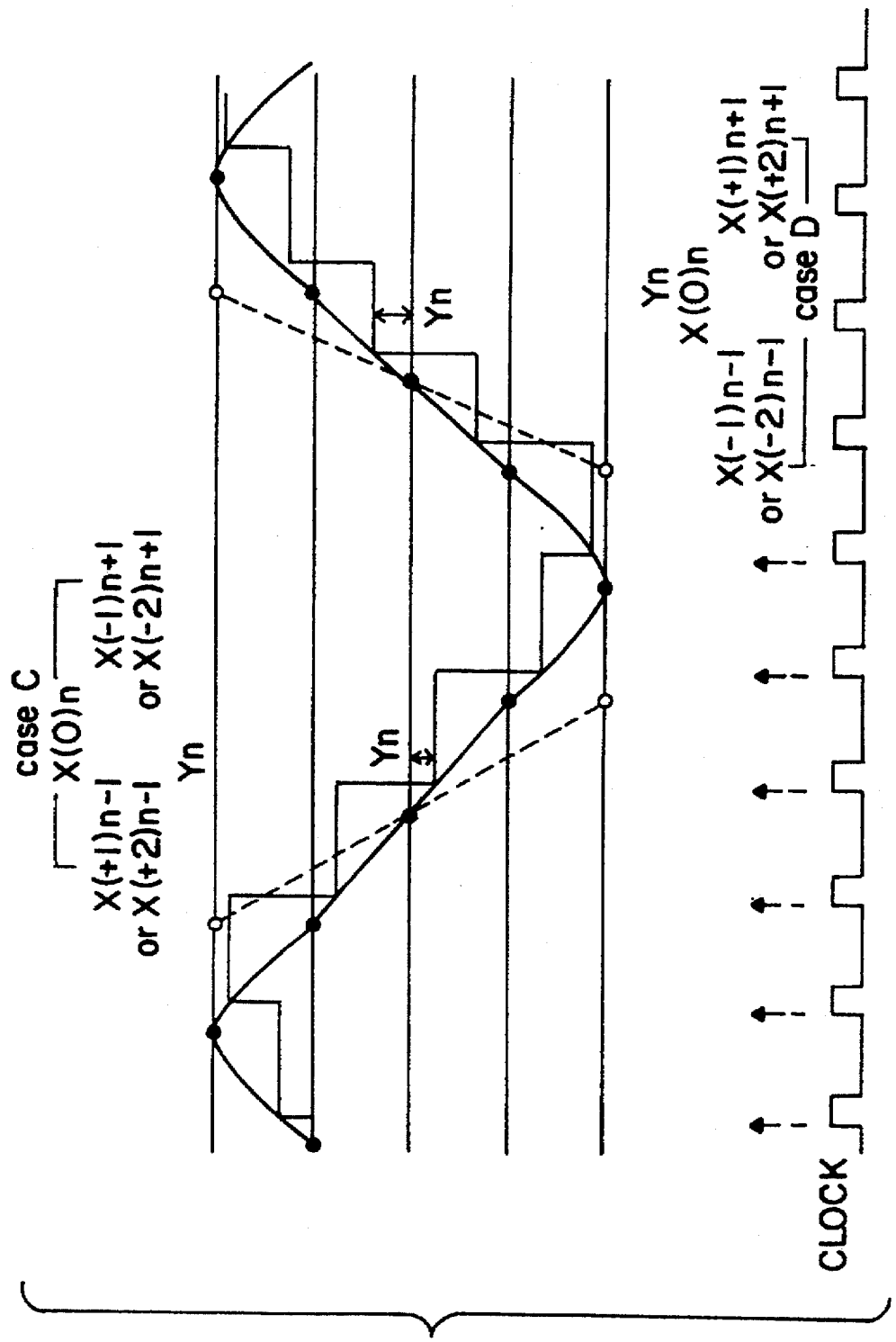
FIG. 8 is a diagram of assistance in explaining the phase difference generating operation in the first modified embodiment of FIG. 7.

FIG. 7 is a block diagram showing a first modified embodiment of the phase difference generation circuit of FIG. 2. FIG. 8 is a diagram of assistance in explaining a phase difference generating operation in the modified embodiment of FIG. 7.

As illustrated in FIG. 7, a third AND gate 71 takes the AND of the three logic signals $X(+1)_{n-1}$, $X(0)_n$, $X(-1)_{n+1}$. That is, the third AND gate 71 generates the enable output when the signal level is [−1] at the (n+1) sampling time, when the signal level is [0] at the (n) sampling time, and when the signal level is [+1] at the (n−1) sampling time.

A fourth AND gate 72 takes the AND of the three logic signals $X(+2)_{n-1}$, $X(0)_n$, $X(-2)_{n+1}$. That is, the fourth AND gate 72 generates the enable output when the signal level is [−2] at the (n+1) sampling time, when the signal level is [0] at the (n) sampling time, and when the signal level is [+2] at the (n−1) sampling time.

A fifth AND gate 73 takes the AND of the three logic signals $X(-1)_{n-1}$, $X(0)_n$, $X(+1)_{n+1}$. That is, the fifth AND gate 73 generates the enable output when the signal level is [+1] at the (n+1) sampling time, when the signal level is [0] at the (n) sampling time, and when the signal level is [−1] at the (n−1) sampling time.

A sixth AND gate 74 takes the AND of the three logic signals $X(-2)_{n-1}$, $X(0)_n$, $X(+2)_{n+1}$. That is, the sixth AND gate 74 generates the enable output when the signal level is [+2] at the (n+1) sampling time, when the signal level is [0] at the (n) sampling time, and when the signal level is [−2] at the (n−1) sampling time.

A first OR gate 75 takes the OR of an output of the third AND gate 71 and an output of the fourth AND gate 72. A second OR gate 76 takes the OR of an output of the fifth AND gate 73 and an output of the sixth AND gate 74.

A first selection circuit 77 outputs the delay signal $Y_n$ at the (n) sampling time when the enable signal is generated from the first OR gate 75. A second selection circuit 78 outputs the delay signal $Y_n$ at the (n) sampling time when the enable signal is generated from the second OR gate 76.

An adder 79 subtracts an output ΔVb1 of the first selection circuit 77 from an output ΔVb2 of the second selection circuit 78 and outputs a control voltage ΔVb to the loop filter 8.

The operation thereof will be explained with reference to FIG. 8. This operation is all exemplified by showing that PLL CLOCK is delayed with respect to the input signal (EPR equalized signal). Then, it is considered that the positive voltage is outputted at that time, and PLL is controlled.

As illustrated in FIG. 8, in a case C where the phase is detected at a zero cross point, a signal used for the PLL control is $Y_n$ at the (n) sampling time. A delay/progress determination is, however, needed depending on polarities of the signals before and after this point.

As a condition for this zero cross detection, it is required that a before-one-sample signal $X(S)_{n-1}$ be [+1] or [+2]. Further, it is a condition that an after-one-sample signal $X(S)_{n+1}$ be [−1] or [−2].

Herein, $Y_n$ is a minus output and is therefore, after taking the condition, inputted to a minus side of the adder 79.

That is, the third AND gate 71 generates the enable signal when performing such a zero cross detection that the signal level is [−1] at the (n+1) sampling time, the signal level is [0] at the (n) sampling time, and the signal level is [+1] at the (n−1) sampling time, thereby obtaining $Y_n$ from the first selection circuit 77.

Similarly, the fourth AND gate 72 generates the enable signal when performing such a zero cross detection that the signal level is [−2] at the (n+1) sampling time, the signal level is [0] at the (n) sampling time, and the signal level is [+2] at the (n−1) sampling time, thereby obtaining $Y_n$ from the first selection circuit 77.

The control signal ΔVb1 at this time is expressed by the following formula:

$$\Delta Vb1 = [\{X(+1)_{n-1} * X(0)_n * X(-1)_{n+1}\} + \{X(+2)_{n-1} * X(0)_n * X(-2)_{n+1}\}] \times Y_n \quad (4)$$

In other case D of detecting the phase at the zero cross point of FIG. 8, the signal used for the PLL control is also $Y_n$ when effecting the (n) sampling time at the zero cross point. The delay/progress determination is, however, needed depending on polarities of the signals before and after this point. As a condition for this zero cross detection, it is required that the before-one-sample signal $X(S)_{n-1}$ be [−1] or [−2]. Further, it is a condition that the after-one-sample signal $X(S)_{n+1}$ be [+1] or [+2].

Herein, $Y_n$ is a plus output and is therefore, after taking the condition, inputted to a plus side of the adder 79.

That is, the fifth AND gate 73 generates the enable signal when performing such a zero cross detection that the signal level is [+1] at the (n+1) sampling time, the signal level is [0] at the (n) sampling time, and the signal level is [−1] at the (n−1) sampling time, thereby obtaining $Y_n$ from the second selection circuit 78.

Similarly, the sixth AND gate 74 generates the enable signal when performing such a zero cross detection that the signal level is [+2] at the (n+1) sampling time, the signal level is [0] at the (n) sampling time, and the signal level is [−2] at the (n−1) sampling time, thereby obtaining $Y_n$ from the second selection circuit 78.

The control signal ΔVb2 at this time is expressed by the following formula:

$$\Delta Vb2 = [\{X(+1)_{n-1} * X(0)_n * X(+1)_{n+1}\} + \{X(-2)_{n-1} * X(0)_n * X(+2)_{n+1}\}] \times Y_n \quad (5)$$

Accordingly, the control voltage ΔVb of the adder 79 is expressed in the following formula (6):

$$\Delta Vb = -\Delta Vb1 + \Delta Vb2 \quad (6)$$

Thus, the control voltage is generated from the signal value at the zero cross point by detecting the zero cross point of the signal, and hence the phase difference can be exactly detected also in the EPR-4 signal.

Figure 9:
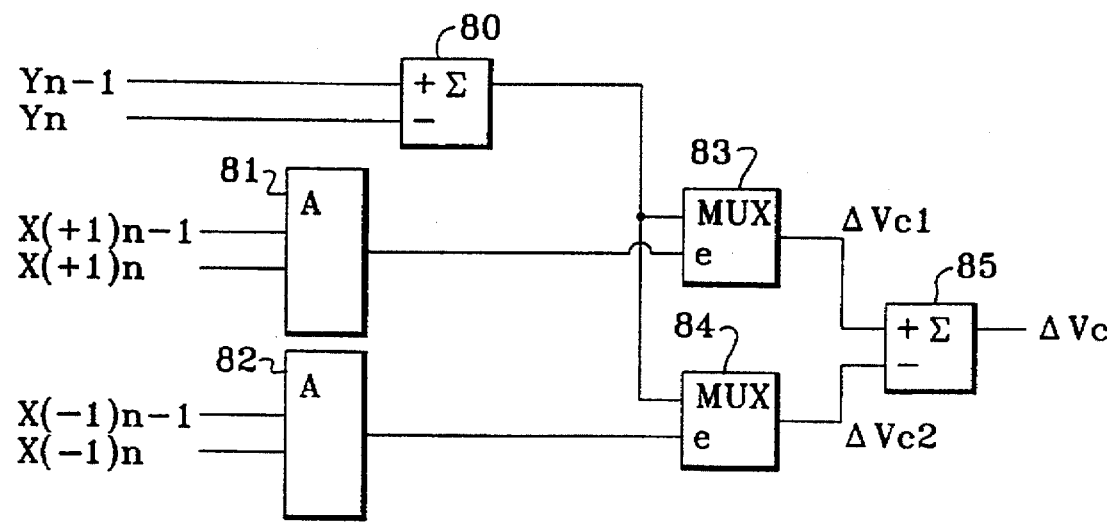
FIG. 9 is a block diagram illustrating a second modified embodiment of the phase difference generation circuit of FIG. 2.
Figure 10:
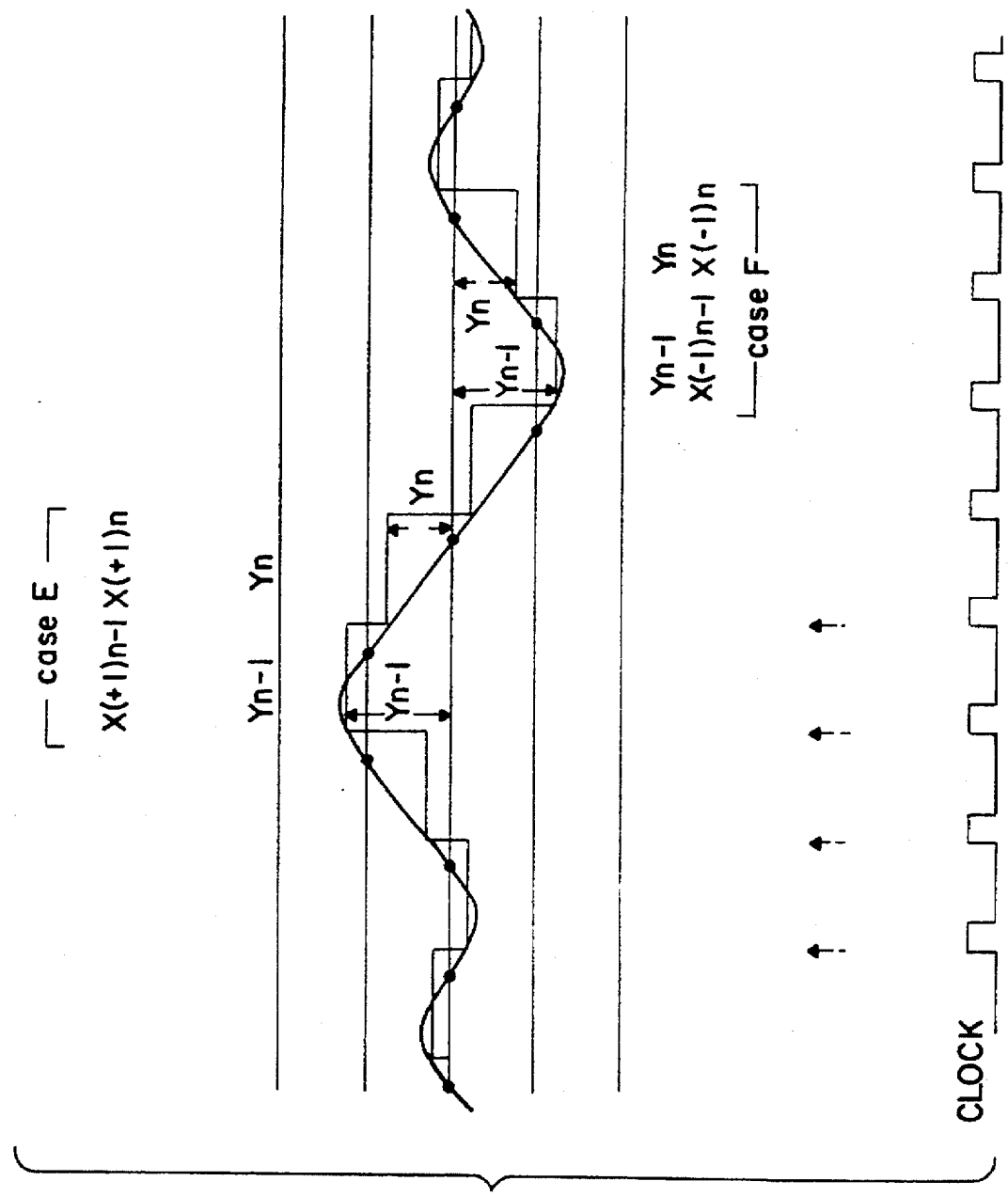
FIG. 10 is a diagram of assistance in explaining the phase difference generating operation in the second modified embodiment.

FIG. 9 is a block diagram showing a second modified embodiment of the phase difference generation circuit of FIG. 2. FIG. 10 is a diagram of assistance in explaining a phase difference generating operation in the modified embodiment of FIG. 9.

As illustrated in FIG. 9, a seventh AND gate 81 takes the AND of the two logic signals $X(+1)_{n-1}$, $X(+1)_n$. That is, the seventh AND gate 81 generates the enable output when the signal level is [+1] at the (n−1) sampling time, and when the signal level is [+1] at the (n) sampling time.

An eighth AND gate 82 takes the AND of the two logic signals $X(-1)_{n-1}$, $X(-1)_n$. That is, the eighth AND gate 82 generates the enable output when the signal level is [−1] at the (n−1) sampling time, and when the signal level is [−1] at the (n) sampling time.

An adder 80 subtracts a first delay signal $Y_n$ at the (n) sampling time from a second delay signal $Y_{n-1}$ at the (n−1) sampling time. A first selection circuit 83 selectively gives forth the outputs of the adder 80 when the enable signal is generated from the seventh AND gate 81. A second selection circuit 84 selectively gives forth the outputs of the adder 80 when the enable signal is generated from the eighth AND gate 82.

An adder 85 subtracts an output ΔVc2 of the second selection circuit 84 from an output ΔVc1 of the first selection circuit 83 and outputs a control voltage ΔVc to the loop filter 8.

The operation thereof will be described with reference to FIG. 10. This operation is all exemplified by showing that PLL CLOCK is delayed with respect to the input signal. Then, it is considered that the positive voltage is output at that time, and PLL is controlled.

As illustrated in FIG. 10, in a case E where the phase is detected at the positive peak, the signals to be compared are signals $Y_{n-1}$ and $Y_n$ before and after the peak. Then, a difference $(Y_{n-1}-Y_n)$ therebetween is positive, and, besides, it is determined that as the difference increases, the clock phase is delayed.

In this embodiment, the signal peak is detected, and the phase difference is generated from sample values before and after the peak. Accordingly, as a detection condition, $(Y_{n-1}-Y_n)$ is obtained when $X(+1)_{n-1}$, $X(+1)_n$ are [1].

Namely, $(Y_{n-1}-Y_n)$ is obtained from the first selection circuit 83 by generating the enable signal from the seventh AND gate 81 when detecting such a positive peak that the signal level is [+1] at the (n−1) sampling time, and the signal level is [+1] at the (n) sampling time.

The control signal ΔVc1 at this time is expressed by the following formula:

$$\Delta Vc1 = \{X(+1)_{n-1} * X(+1)_n\} \times (Y_{n-1}-Y_n) \quad (7)$$

In a case F where the phase is detected at the negative peak, the signals to be compared are signals $Y_{n-1}$ and $Y_n$ before and after the peak. Then, a difference $(Y_{n-1}-Y_n)$ therebetween is negative, and, besides, it is determined that as the difference increases, the clock phase is delayed.

In this embodiment, the signal peak is detected, and the phase difference is generated from sample values before and after the peak. Accordingly, as a detection condition, $(Y_{n-1}-Y_n)$ is obtained when $X(-1)_{n-1}$, $X(-1)_n$ are [1].

Namely, $(Y_{n-1}-Y_n)$ is obtained from the second selection circuit 84 by generating the enable signal from the eighth AND gate 82 when detecting such a negative peak that the signal level is [−1] at the (n) sampling time, and the signal level is [−1] at the (n−1) sampling time.

The control signal ΔVc2 at this time is expressed by the following formula:

$$\Delta Vc2=\{X(-1)_{n-1}*X(-1)_n\}\times(Y_{n-1}-Y_n) \qquad (8)$$

Accordingly, the control voltage $\Delta Vc$ outputted from the adder 85 at this time is expressed by the following formula (9).

$$\Delta Vc=\Delta Vc1-\Delta Vc2 \qquad (9)$$

Thus, even when the signal amplitude decreases, the positive and negative peaks of the signal are detected, and the control voltage is generated from the signal values on both sides thereof. Therefore, the phase difference can be exactly detected also in the EPR-4 signal. Besides, this is attainable with the simple circuit.

Figure 11:
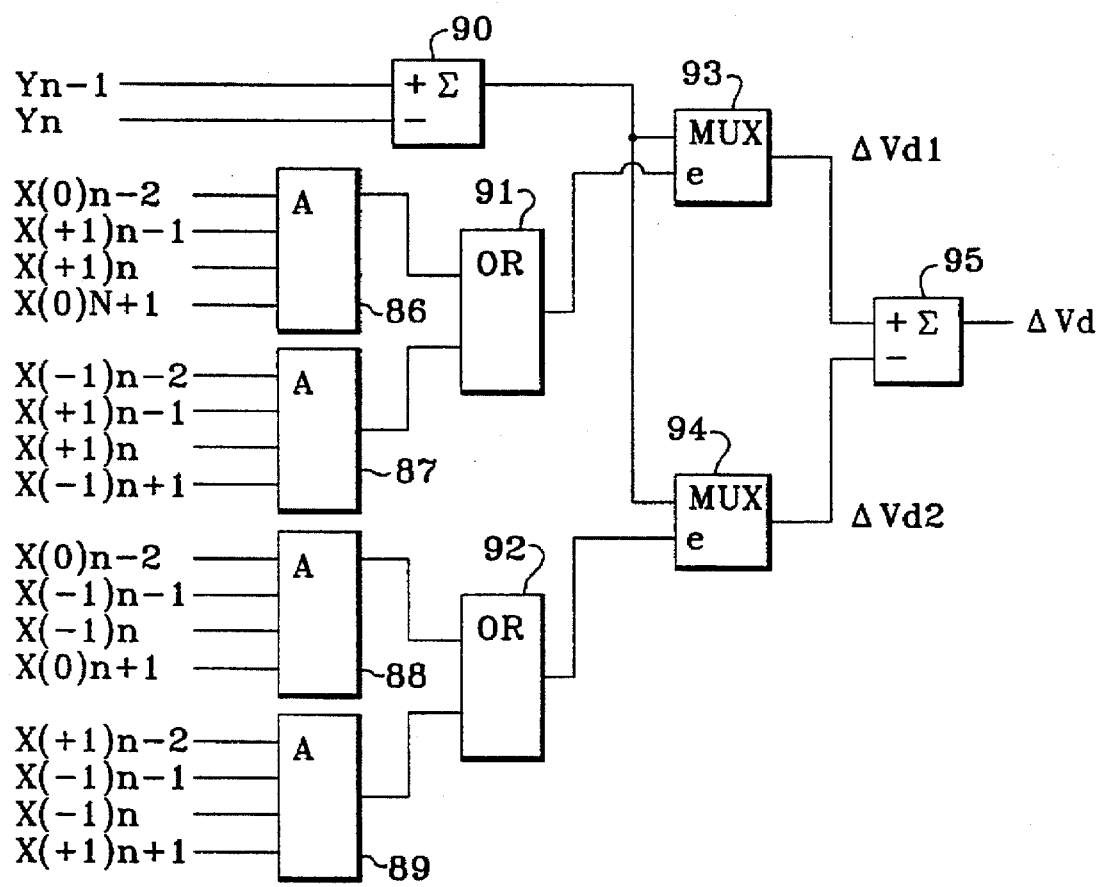
FIG. 11 is a block diagram showing a third modified embodiment of the phase difference generation circuit of FIG. 2.
Figure 12:
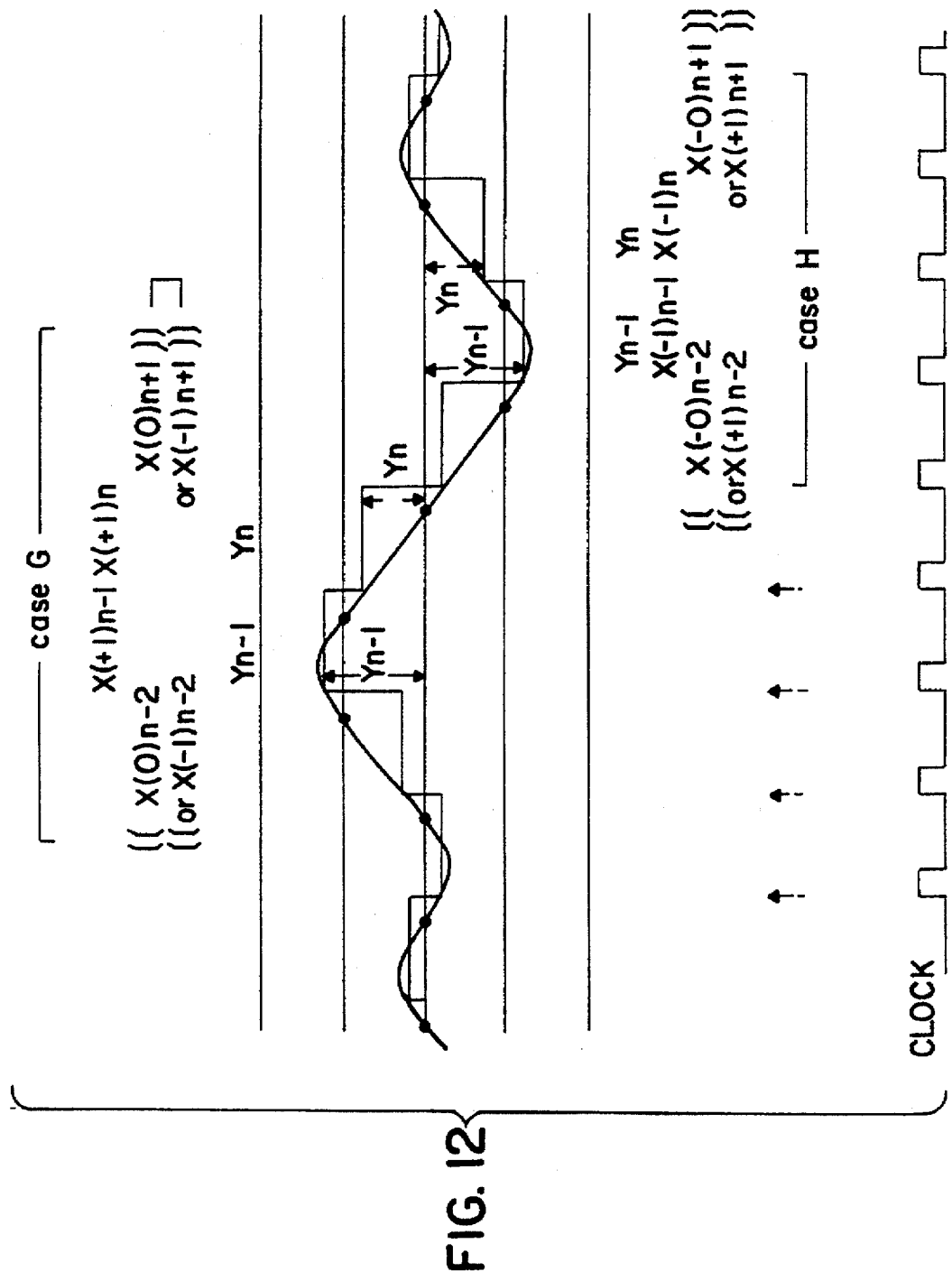
FIG. 12 is a diagram of assistance in explaining the phase difference generating operation in the third modified embodiment of FIG. 11.

FIG. 11 is a block diagram showing a third modified embodiment of the phase difference generation circuit of FIG. 2. FIG. 12 is a diagram of assistance in explaining the phase difference generating operation in the modified embodiment of FIG. 11.

As illustrated in FIG. 11, a ninth AND gate 86 takes the AND of the four logic signals $X(0)_{n-2}$, $X(+1)_{n-1}$, $X(+1)_n$, $X(0)_{n+1}$. A tenth AND gate 87 takes the AND of the four logic signals $X(-1)_{n-2}$, $X(+1)_{n-1}$, $X(+1)_n$, $X(-1)_{n+1}$. A first OR gate 91 takes the OR of two logic signals, i.e., an output of the ninth AND gate 86 and an output of the tenth AND gate 87.

That is, the first OR gate 91 generates the enable output when the signal level is [+1] at the (n-1) sampling time, when the signal level is [+1] at the (n) sampling time, when the signal level is [0] or [-1] at the (n-2) sampling time, and when the signal level is [0] or [-1] at the (n+1) sampling time.

An eleventh AND gate 88 takes the AND of the four logic signals $X(0)_{n-2}$, $X(-1)_{n-1}$, $X(-1)_n$, $X(0)_{n+1}$. A twelfth AND gate 89 takes the AND of the four logic signals $X(+1)_{n-2}$, $X(-1)_{n-1}$, $X(-1)_n$, $X(+1)_{n+1}$. A second OR gate 92 takes the OR of two logic signals, i.e., an output of the AND gate 88 and an output of the twelfth AND gate 89.

That is, the second OR gate 92 generates the enable output when the signal level is [-1] at the (n-1) sampling time, when the signal level is [-1] at the (n) sampling time, when the signal level is [0] or [+1] at the (n-2) sampling time, and when the signal level is [0] or [+1] at the (n+1) sampling time.

An adder 90 subtracts the first delay signal $Y_n$ at the (n) sampling time from a second delay signal $Y_{n-1}$ at the (n-1) sampling time. A first selection circuit 93, when the enable signal is generated from the first OR gate 91, selectively gives forth outputs of the adder 90. A second selection circuit 94, when the enable signal is generated from the second OR gate 92, selectively gives forth the outputs of the adder 90.

An adder 95 subtracts an output $\Delta Vd2$ of the second selection circuit 94 from an output $\Delta Vd1$ of the first selection circuit 93 and outputs a control voltage $\Delta Vc$ to the loop filter 8.

The operation thereof will be explained with reference to FIG. 12. This operation is all exemplified by showing that PLL CLOCK is delayed with respect to the input signal. Then, it is considered that the positive voltage is outputted at that time, and PLL is controlled.

As illustrated in FIG. 12, in a case G where the phase is detected at the positive peak, the signals to be compared are signals $Y_{n-1}$ and $Y_n$ before and after the peak. Then, a difference $(Y_{n-1}-Y_n)$ therebetween is positive, and, besides, it is determined that as the difference increases, the clock phase is delayed.

In this embodiment, the signal peak is detected, and the phase difference is generated from sample values before and after the peak. Accordingly, as a detection condition, $(Y_{n-1}-Y_n)$ is obtained when $X(+1)_{n-1}$, $X(+1)_n$ are [1], when $X(0)_{n-2}$ or $X(-1)_{n-2}$ is [1], and when $X(0)_{n+1}$ or $X(-1)_{n+1}$ is [1].

Namely, the first OR gate 91 generates the enable signal when performing such a positive peak detection that signal level is [+1] at the (n+1) sampling time, the signal level is [+1] at the (n) sampling time, the signal level is [0] or [-1] at the (n-2) sampling time, and the signal level is [0] or [-1] at the (n+1) sampling time. Thus, $(Y_{n-1}-Y_n)$ is obtained from the first selection circuit 93.

The control signal $\Delta Vd1$ at this time is expressed by the following formula:

$$\Delta Vd1=[\{X(0)_{n-2}+X(-1)_{n-2}\}*X(+1)_{n-1}*\{X(0)_{n+1}+X(-1)_{n+1}\}*X(+1)_n]\times(Y_{n-1}-Y_n) \qquad (10)$$

Namely, as compared with the embodiment of FIG. 9, there are added the signal level at the (n-2) sampling time and the signal level at the (n+1) sampling time by way of the detection condition of the peak signal. The peak can be thereby detected more accurately.

Next, in a case H of detecting the phase at the negative peak, the signals to be compared are the signals $Y_{n-1}$ and $Y_n$ before and after the peak. Then, a difference $(Y_{n-1}-Y_n)$ therebetween is negative, and, besides, it is determined that as the difference increases, the clock phase is delayed.

In this embodiment also, the signal peak is detected, and the phase difference is generated from sample values before and after the peak. Accordingly, as a detection condition, $(Y_{n-1}-Y_n)$ is obtained when $X(-1)_{n-1}$ and $X(-1)_n$ are [1], when $X(0)_{n-2}$ or $X(+1)_{n-2}$ is [1], and when $X(0)_{n+1}$ or $X(+1)_{n+1}$ is [1].

That is, the second OR gate 92 generates the enable signal when performing such a negative peak detection that the signal level is [-1] at the (n) sampling time, the signal level is [-1] at the (n-1) sampling time, the signal level is [0] or [+1] at the (n-2) sampling time, and the signal level is [0] or [+1] at the (n+1) sampling time. Thus, $(Y_{n-1}-Y_n)$ is obtained from the second selection circuit 94.

The control signal $\Delta Vd2$ at this time is expressed by the following formula:

$$\Delta Vd2 = [\{X(0)_{n-2}+X(+1)_{n-2}\}*X(-1)_{n-1}*X(-1)_n*\{X(0)_{n+1}+X(+1)_{n+1}\}]\times(Y_{n-1}-Y_n) \qquad (11)$$

Namely, as compared with the embodiment of FIG. 9, there are added the signal level at the (n-2) sampling time and the signal level at the (n+1) sampling time by way of detection condition of the peak signal. The peak can be thereby detected more accurately.

Hence, the control voltage $\Delta Vd$ outputted from the adder 95 at this time is expressed by the following formula (12):

$$\Delta Vd=\Delta Vd1-\Delta Vd2 \qquad (12)$$

Thus, the control voltage is generated from the signal values on both sides of the peak, and, therefore, the phase difference can be exactly detected also in the EPR-4 signal. Besides, the peak is accurately detectable.

Figure 13:
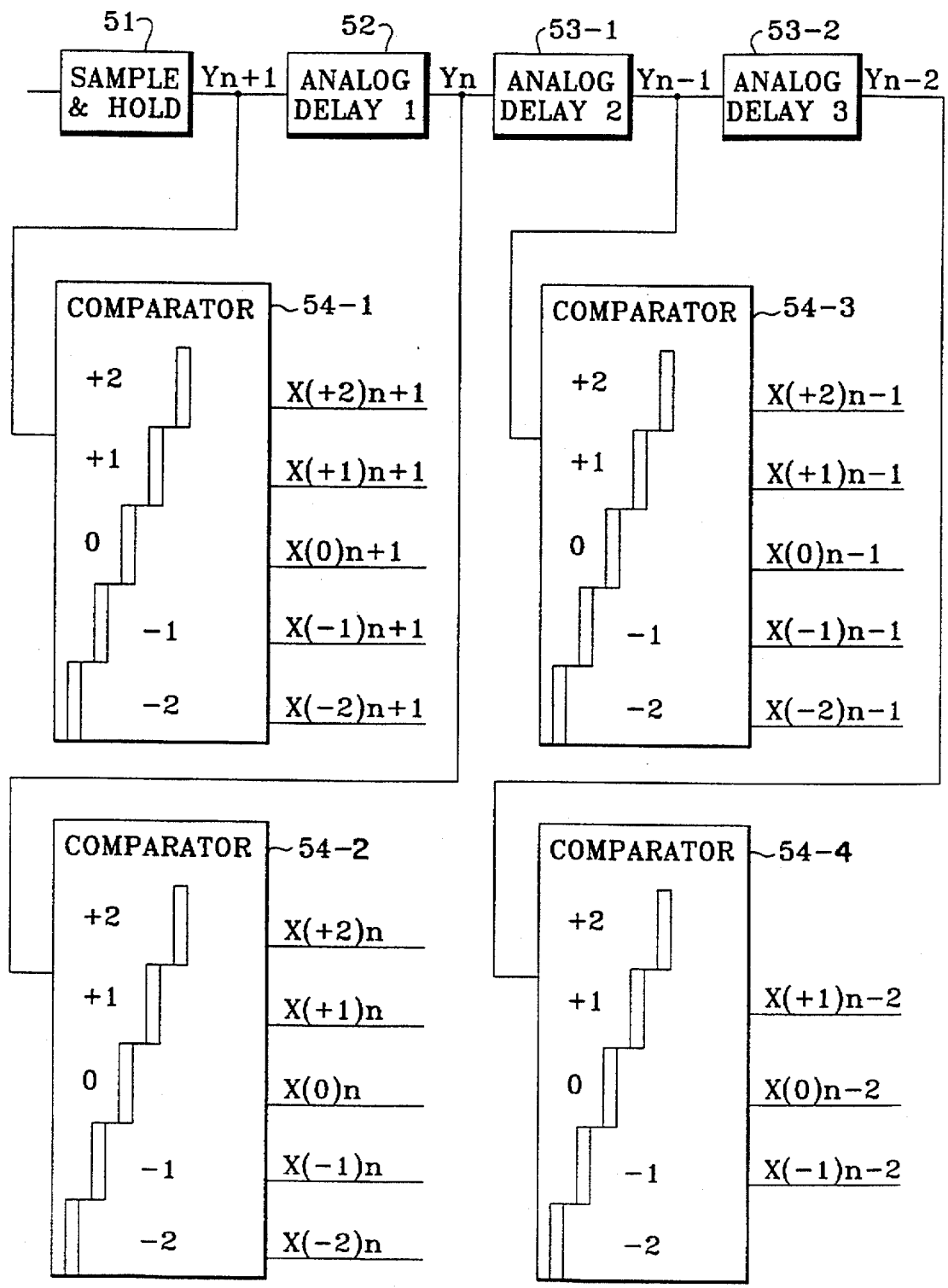
FIG. 13 is a block diagram illustrating a modified embodiment of the quinary determination circuit of FIG. 2.

FIG. 13 is a block diagram showing a modified embodiment of the quinary determination circuit according to the present invention. According to this modified embodiment, in the quinary determination circuit shown in FIG. 3, the digital delay circuits 55–67 are omitted, but four sets of quinary comparator circuits are provided.

As illustrated in FIG. 13, a third analog delay circuit 53-2 delays an output $Y_{n-1}$ of a second analog delay circuit 53-1 by one sample and thus outputs a signal $Y_{n-2}$.

A first quinary comparator circuit 54-1 quinary-determines the output $Y_{n+1}$ of the sample hold circuit 51 and outputs quinary determination signals $X(+2)_{n+1}$–$X(-2)_{n+1}$. A second quinary comparator circuit 54-2 quinary-determines the output $Y_n$ of the first delay circuit 52 and outputs quinary determination signals $X(+2)_n$–$X(-2)_n$.

A third quinary comparator circuit 54-3 quinary-determines the output $Y_{n-1}$ of the second delay circuit 53-1 and outputs quinary determination signals $X(+2)_{n-1}$–$X(-2)_{n-1}$. A fourth quinary comparator circuit 54-4 quinary-determines the output $Y_{n-2}$ of the third delay circuit 53-2 and outputs quinary determination signals $X(+1)_{n-2}$–$X(-1)_{n-2}$.

Even when constructed in this way, as in the embodiment of FIG. 3, there are obtained $X(+2)_{n+1}$–$X(-2)_{n+1}$ at the (n+1) sampling time, $X(+2)_n$–$X(-2)_n$ at the (n) sampling time, $X(+2)_{n-1}$–$X(-2)_{n-1}$ at the (n–1) sampling time and $X(+1)_{n-2}$–$X(-1)_{n-2}$ at the (n–2) sampling time.

In addition to the above-discussed embodiments, according to the present invention, the following modifications can be carried out.

First, the phase difference detection circuit has been explained by way of one embodiment through the third modified embodiment but can be properly selected in accordance with a performance required and a signal pattern. Further, there may be employed a combination of the circuit in one embodiment with the circuit in the first modified embodiment, or a combination of the circuit in one embodiment with the circuit in the second modified embodiment or the circuit in the third modified embodiment, or a combination of the circuit in the first modified embodiment with the circuit in the second modified embodiment or the circuit in the third modified embodiment or a combination of the circuit in one embodiment with the circuit in the first embodiment and the circuit in the second modified embodiment or the circuit in the third modified embodiment.

Second, the quinary signals have been created at the four slice levels, but a higher accuracy is obtained by setting the signals having values exceeding the quinary values at a larger number of slice levels that the four levels. In the demodulator circuit aiming at downsizing as in the case of the magnetic disk device, setting the quinary signals at the four slice levels may be preferable.

Third, the present invention has been described by exemplifying the demodulator circuit of the magnetic disc device but is applicable to a demodulator circuit of a magneto-optic disc and communications, etc.

The present invention has been discussed so far by way of the embodiments, but a variety of modifications can be carried out in the scope of the gist of the present invention. Those modifications are not excluded from the range of the present invention.

As explained above, according to the present invention, the sample hold output is quinary-converted, and therefore the easy-to-detect waveform of the phase difference of the EPR-4 signal can be detected from the quinary output. It is thus possible to accurately detect the phase difference of the EPR-4 signal. Further, the present invention can be actualized with the simple construction of the circuit.

What is claimed is:

1. A phase difference detection circuit for detecting a phase difference between an equalized signal obtained by equalizing an extended partial-response class-4 signal and a sampling clock, said circuit comprising:

a sample hold means for sampling and holding the equalized signal at the sampling clock;

a comparator means for comparing the sampled and held signals with at least four slice levels and converting them into determination level signals having at least quinary values; and a phase difference generation means for generating a phase difference on the basis of at least the quinary determination level signals from said comparator means and outputs of said sample hold means.

2. The phase difference detection circuit according to claim 1, wherein said sample hold means includes:
one sample hold circuit;
a first delay circuit for delaying an output signal $Y_{n+1}$ of said sample hold circuit to obtain an output signal $Y_n$; and
a second delay circuit for delaying the output signal $Y_n$ of said first delay circuit to obtain an output signal $Y_{n-1}$.

3. The phase difference detection circuit according to claim 2, wherein said phase difference generation means includes:

a first circuit for detecting an establishment of one of such a first condition that the quinary determination level $(X(S)_{n-1})$ at the (n–1) sampling time exhibits (+1), the quinary determination level $(X(S)_n)$ at the (n) sampling time exhibits (+2), and the quinary determination level $(X(S)_{n+1})$ at the (n+1) sampling time exhibits (+1) and such a second condition that the quinary determination level $(X(S)_{n-1})$ at the (n–1) sampling time exhibits (–1), the quinary determination level $(X(S)_n)$ at the (n) sampling time exhibits (–2), and the quinary determination level $(X(S)_{n+1})$ at the (n+1) sampling time exhibits (–1); and a phase difference output circuit for subtracting the output signal $Y_{n+1}$ at the (n+1) sampling time from the output signal $Y_{n-1}$ at the (n–1) sampling time in accordance with the detection of the establishment of the condition in said first circuit.

4. The phase difference detection circuit according to claim 3, wherein said first circuit includes:

a first AND gate for obtaining the AND of a bit in which the quinary determination level $(X(S)_{n-1})$ at the (n–1) sampling time exhibits (+1), a bit in which the quinary determination level $(X(S)_n)$ at the (n) sampling time exhibits (+2), and a bit in which the quinary determination level $(X(S)_{n+1})$ at the (n+1) sampling time exhibits (+1); and a second AND gate for obtaining the AND of a bit in which the quinary determination level $(X(S)_{n-1})$ at the (n–1) sampling time exhibits (–1), a bit in which the quinary determination level $(X(S)_n)$ at the (n) sampling time exhibits (–2), and a bit in which the quinary determination level $(X(S)_{n+1})$ at the (n+1) sampling time exhibits (–1).

5. The phase difference detection circuit according to claim 2, wherein said phase difference generation means includes:

a second circuit for detecting an establishment of one of such a third condition that the quinary determination level $(X(S)_{n-1})$ at the (n–1) sampling time exhibits (+1), the quinary determination level $(X(S)_n)$ at the (n) sampling time exhibits (0), and the quinary determination level $(X(S)_{n+1})$ at the (n+1) sampling time exhibits (−1), such a fourth condition that the quinary determination level $(X(S)_{n-1})$ at the (n−1) sampling time exhibits (+2), the quinary determination level $(X(S)_n)$ at the (n) sampling time exhibits (0), and the quinary determination level $(X(S)_{n+1})$ at the (n+1) sampling time exhibits (−2), such a fifth condition that the quinary determination level $(X(S)_{n-1})$ at the (n−1) sampling time exhibits (−1), the quinary determination level $(X(S)_n)$ at the (n) sampling time exhibits (0), and the quinary determination level $(X(S)_{n+1})$ at the (n+1) sampling time exhibits (+1) and such a sixth condition that the quinary determination level $(X(S)_{n-1})$ at the (n−1) sampling time exhibits (−2), the quinary determination level $(X(S)_n)$ at the (n) sampling time exhibits (0), and the quinary determination level $(X(S)_{n+1})$ at the (n+1) sampling time exhibits (+2); and a phase difference output circuit for generating the output signal $Y_n$ at the (n) sampling time as a phase difference output in accordance with a detection of the establishment of condition in said second circuit.

6. The phase difference detection circuit according to claim 5, wherein said second circuit includes:

a third AND gate for taking the AND of a bit in which the quinary determination level $(X(S)_{n-1})$ at the (n−1) sampling time exhibits (+1), a bit in which the quinary determination level $(X(S)_n)$ at the (n) sampling time exhibits (0), and a bit in which the quinary determination level $(X(S)_{n+1})$ at the (n+1) sampling time exhibits (−1);

a fourth AND gate for obtaining the AND of a bit in which the quinary determination level $(X(S)_{n-1})$ at the (n−1) sampling time exhibits (+2), a bit in which the quinary determination level $(X(S)_n)$ at the (n) sampling time exhibits (0), and a bit in which the quinary determination level $(X(S)_{n+1})$ at the (n+1) sampling time exhibits (−2);

a fifth AND gate for obtaining the AND of a bit in which the quinary determination level $(X(S)_{n-1})$ at the (n−1) sampling time exhibits (−1), a bit in which the quinary determination level $(X(S)_n)$ at the (n) sampling time exhibits (0), and a bit in which the quinary determination level $(X(S)_{n+1})$ at the (n+1) sampling time exhibits (+1); and a sixth AND gate for obtaining the AND of a bit in which the quinary determination level $(X(S)_{n-1})$ at the (n−1) sampling time exhibits (−2), a bit in which the quinary determination level $(X(S)_n)$ at the (n) sampling time exhibits (0), and a bit in which the quinary determination level $(X(S)_{n+1})$ at the (n+1) sampling time exhibits (+2).

7. The phase difference detection circuit according to claim 2, wherein said phase difference generation means includes:

a third circuit for detecting an establishment of one of such a seventh condition that the quinary determination level $(X(S)_{n-1})$ at the (n−1) sampling time exhibits (+1), and the quinary determination level $(X(S)_n)$ at the (n) sampling time exhibits (+1) and such an eighth condition that the quinary determination level $(X(S)_{n-1})$ at the (n−1) sampling time exhibits (−1), and the quinary determination level $(X(S)_n)$ at the (n) sampling time exhibits (−1); and a phase difference output circuit for subtracting the output signal $Y_n$ at the (n) sampling time from the output signal $Y_{n-1}$ at the (n−1) sampling time in accordance with the detection of the establishment of the condition in said third circuit.

8. The phase difference detection circuit according to claim 7, wherein said third circuit includes:

a seventh AND gate for obtaining the AND of a bit in which the quinary determination level $(X(S)_{n-1})$ at the (n−1) sampling time exhibits (+1) and a bit in which the quinary determination level $(X(S)_n)$ at the (n) sampling time exhibits (+1); and an eighth AND gate for obtaining the AND of a bit in which the quinary determination level $(X(S)_{n-1})$ at the (n−1) sampling time exhibits (−1) and a bit in which the quinary determination level $(X(S)_n)$ at the (n) sampling time exhibits (−1).

9. The phase difference detection circuit according to claim 2, wherein said phase difference generation means includes:

a fourth circuit for detecting an establishment of one of such a ninth condition that the quinary determination level $(X(S)_{n-2})$ at the (n−2) sampling time exhibits (0), the quinary determination level $(X(S)_{n-1})$ at the (n−1) sampling time exhibits (+1), the quinary determination level $(X(S)_n)$ at the (n) sampling time exhibits (+1), and the quinary determination level $(X(S)_{n+1})$ at the (n+1) sampling time exhibits (0), such a tenth condition that the quinary determination level $(X(S)_{n-2})$ at the (n−2) sampling time exhibits (−1), the quinary determination level $(X(S)_{n-1})$ at the (n−1) sampling time exhibits (+1), the quinary determination level $(X(S)_n)$ at the (n) sampling time exhibits (+1), and the quinary determination level $(X(S)_{n+1})$ at the (n+1) sampling time exhibits (−1), such an eleventh condition that the quinary determination level $(X(S)_{n-2})$ at the (n−2) sampling time exhibits (0), the quinary determination level $(X(S)_{n-1})$ at the (n−1) sampling time exhibits (−1), the quinary determination level $(X(S)_n)$ at the (n) sampling time exhibits (−1), and the quinary determination level $(X(S)_{n+1})$ at the (n+1) sampling time exhibits (0) and such a twelfth condition that the quinary determination level $(X(S)_{n-2})$ at the (n−2) sampling time exhibits (+1), the quinary determination level $(X(S)_{n-1})$ at the (n−1) sampling time exhibits (−1), the quinary determination level $(X(S)_n)$ at the (n) sampling time exhibits (−1), and the quinary determination level $(X(S))$ at the (n+1) sampling time exhibits (+1); and a phase difference output circuit for subtracting the output signal $Y_n$ at the (n) sampling time from the output signal $Y_{n-1}$ at the (n−1) sampling time in accordance with the detection of the establishment of the condition in said fourth circuit.

10. The phase difference detection circuit according to claim 9, wherein said fourth circuit includes:

a ninth AND gate for obtaining the AND of a bit in which the quinary determination level $(X(S)_{n-2})$ at the (n−2) sampling time exhibits (0), a bit in which the quinary determination level $(X(S)_{n-1})$ at the (n−1) sampling time exhibits (+1), a bit in which the quinary determination level $(X(S)_n)$ at the (n) sampling time exhibits (+1) and a bit in which the quinary determination level $(X(S)_{n+1})$ at the (n+1) sampling time exhibits (0);

a tenth AND gate for obtaining the AND of a bit in which the quinary determination level $(X(S)_{n-2})$ at the (n−2) sampling time exhibits (−1), a bit in which the quinary determination level $(X(S)_{n-1})$ at the (n−1) sampling time exhibits (+1), a bit in which the quinary determination level $(X(S)_n)$ at the (n) sampling time exhibits (+1) and a bit in which the quinary determination level $(X(S)_{n+1})$ at the (n+1) sampling time exhibits (−1);

a eleventh AND gate for obtaining the AND of a bit in which the quinary determination level $(X(S)_{n-2})$ at the (n−2) sampling time exhibits (0), a bit in which the quinary determination level $(X(S)_{n-1})$ at the (n−1) sampling time exhibits (−1), a bit in which the quinary determination level $(X(S)_n)$ at the (n) sampling time exhibits (−1) and a bit in which the quinary determination level $(X(S)_{n+1})$ at the (n+1) sampling time exhibits (0);

a twelfth AND gate for obtaining the AND of a bit in which the quinary determination level $(X(S)_{n-2})$ at the (n−2) sampling time exhibits (+1), a bit in which the quinary determination level $(X(S)_{n-1})$ at the (n−1) sampling time exhibits (−1), a bit in which the quinary determination level $(X(S)_n)$ at the (n) sampling time exhibits (−1) and a bit in which the quinary determination level $(X(S)_{n+1})$ at the (n+1) sampling time exhibits (+1).

* * * * *

UNITED STATES PATENT AND TRADEMARK OFFICE
CERTIFICATE OF CORRECTION

PATENT NO. : 5,696,793
DATED : December 9, 1997
INVENTOR(S) : Yoshihiro Hashimura It is certified that error appears in the above-identified patent and that said Letters Patent is hereby corrected as shown below:

Column 4, line 50, delete "$X(+2)_{n+1}$" and insert --$X(+2)_{n-1}$-- therefor

Column 4, line 62, delete "$X(-2)_{n+1}$" and insert --$X(-2)_{n-1}$-- therefor

Signed and Sealed this

Twenty-ninth Day of September, 1998

Attest:

BRUCE LEHMAN

*Attesting Officer*  *Commissioner of Patents and Trademarks*